D. D. WELLS.
BORING AND THREADING TOOL.
APPLICATION FILED OCT. 15, 1919.

1,382,447.

Patented June 21, 1921.

WITNESSES
Frederick Diehl.
W. H. Wright

INVENTOR
D. D. WELLS
BY Munn & Co
ATTORNEYS

UNITED STATES PATENT OFFICE.

DANIEL DOOLITTLE WELLS, OF BURKBURNETT, TEXAS.

BORING AND THREADING TOOL.

1,382,447. Specification of Letters Patent. Patented June 21, 1921.

Application filed October 15, 1919. Serial No. 330,842.

*To all whom it may concern:*

Be it known that I, DANIEL D. WELLS, a citizen of the United States, and a resident of Burkburnett, in the county of Wichita and State of Texas, have invented a new and Improved Boring and Threading Tool, of which the following is a full, clear, and exact description.

This invention relates to internal boring and threading tools and has particular reference to a tool of this character in which the cutting or threading bit is resiliently supported relatively to the shank of the tool.

Among the important objects of the invention are to provide an internal spring boring and threading tool which when used for instance in cutting screw threads or in finishing smooth bores, will enable a smooth and even surface to be produced with a minimum of skill on the part of the operator. Also, to provide a tool of this character that will enable heavy or rough cuts to be taken especially on uneven stock without danger of the tool biting into the work and breaking.

Another object is to produce an improved internal boring or threading tool that may be manufactured exceedingly cheap in a simple manner, at the same time being capable of carrying out its intended use to the greatest efficiency.

Further objects will appear upon reference to the accompanying drawings, in which—

Figure 1:
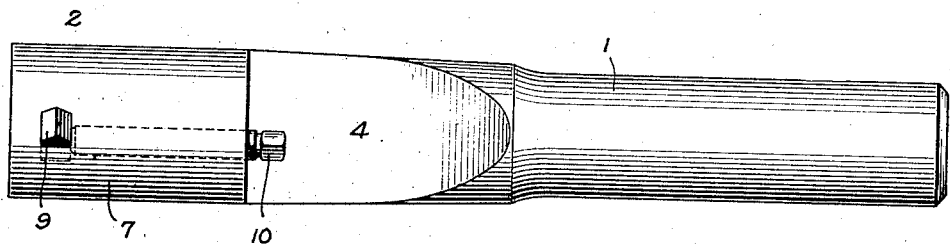
Figure 1 is a side view of the tool.
Figure 2:
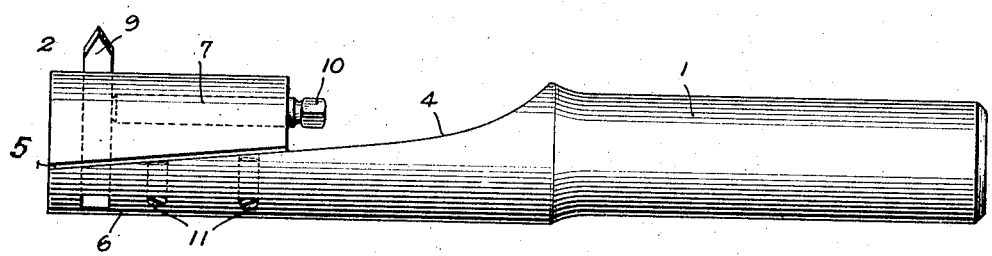
Fig. 2 is a view looking at another side of the tool from that shown in Fig. 1.

Referring to the drawings in detail according to the preferred embodiment of the invention, the tool consists of a shank 1 terminating at one end in a bit-receiving head 2. The head 2 is provided with a longitudinal bore 3 produced eccentric to the axis of the shank 1 and terminating rearwardly in a tapering cutaway portion 4 of the shank. A radial slot 5 is provided in the head 2 and extends the length of the bore 3 and terminates in the side of the head. This slot 5 divides the head primarily into two parts 6 and 7 which are joined by a relatively thin, resilient web 8. It will be seen that one of the divided parts, namely 6, is essentially a continuation of the shank 1 whereas the part 7, on account of the bore, the slot, and the cutaway portion 4, is practically separate from the shank 1 except for the resilient web 8. The important feature of the invention consists in supporting a cutting bit such as 9 in the holder with a cushion effect relative to the shank 1 to which end part 7 is preferably selected as a bit-supporting member. It is therefore provided with a transverse recess made to receive the bit 9 in a manner to support the same transversely of the axis of the bore 3 whereby it may be presented in proper position for internal threading or boring. A suitable elongated set screw 10, disposed in a longitudinal recess in the head, may be employed as a means for maintaining the bit 9 in the part 7. When the tool is in use shank 1 will preferably be rigidly held by the tool post of the machine and the bit 9 will be presented in a position to act upon the work. Should for any reason the bit bite too deeply into the work, its resilient support relative to the shank will produce a cushion effect, that is to say, while the part 6 of the head is permanently fixed to the shank 1, the part 7 which carries the bit will be permitted to move a distance substantially to that of the width of the slot 5 and the resilient web 8 will absorb the shock incident to the abruptness by which the bit 9 is retarded and in this way permit a sufficient give to prevent the bit from being broken.

Figure 3:
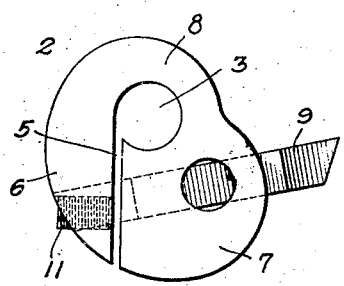
Fig. 3 is an end view of the head.

In some instances it will be desirable to adjust the cushioning effect or in other words limit the movement of the part 7 to which end it is proposed to provide one or more set screws such as 11 preferably in the part 6 of the head and in position whereby they may be presented within the slot 5 to contact with the part 7 and limit its movement. When the set screws are not in use they may be withdrawn so as to clear the slot 5 and assume a position substantially as shown in Fig. 3.

It often happens that tools of this general character have a tendency to dig in so to speak, due to the peculiarities of the machine construction with which they are associated. With my tool this tendency to dig in is overcome and it greatly facilitates securing a smooth polished surface in boring holes and particularly upon the sides or angles of internal screw threads. This is true regardless of the skill of the machinist. Still another feature of the device resides in enabling heavier cuts to be taken than has hereinbefore been possible with rigidly supported bits without breaking the bit.

While I have illustrated and shown the preferred form of the tool, it will, of course, be understood that changes may be made without departing from the spirit of the invention.

Having thus described my invention, I claim as new and desire to secure by Letters Patent:

1. A tool holder having a shank, a head at one end of the shank axially alined therewith and having a lengthwise bore extending therethrough at one side of its axis and a slot for its full length extending therethrough from one side of the bore whereby to divide the same into two parts connected by a web at the opposite side of the bore, said shank being cut away at the rear of the head to the depth of the slot whereby one part of the head will be resilient with respect to the other part and the shank, and a tool adjustably mounted in the resilient part of the head.

2. A tool holder having a tool receiving head and a shank axially alined with the head and partly cut away adjacent to the rear end of the head, said head having a longitudinal bore and a radial slot extending therethrough at one side of the bore and dividing the head into two parts connected with one another at the opposite side of the bore, one of which is rigid with the shank and the other of which is resilient with respect thereto, and a tool mounted in the resilient part of the head as described.

3. A tool holder including a shank, a head at one end of and axially alined with the shank, said head having a bore and a slot, both extending for the full length of the head in the general direction of the coaxial plane of the head and shank, the slot being through that portion of the head at one side of the bore and dividing the head into two parts one of which is resilient with respect to the other part and the shank, and a tool adjustably mounted in the resilient part of the head.

4. A tool holder including a shank, a head at one end of and axially alined with the shank, said head having a bore and a slot, both extending for the full length of the head in the general direction of the coaxial plane of the head and shank, the slot being through that portion of the head at one side of the bore and dividing the head into two parts one of which is resilient with respect to the other part and the shank, said shank being cut away at the rear end of the resilient part of the head, a tool adjustably mounted in the resilient part of the head and projecting therefrom at right angles to the axis of the shank, and an adjusting screw threaded lengthwise in the head to engage and hold the tool, having its adjusting head within the cut away portion of the shank as described.

5. In a device of the character described, a tool-receiving head, a shank on said head, a longitudinal bore in said head terminating rearwardly at a cutaway portion of the shank, a slot in the head extending the length of said bore and through that portion of the head at one side of the bore and dividing the head into two parts connected by a relatively thin resilient web at the opposite side of the bore, one of which is rigid with the shank, whereby a tool carried by the other of said divided parts will be cushioned relatively to the said shank, and means for adjusting the resiliency of said resilient web comprising a set screw carried by the said rigid part adapted to be presented through said slot and adjustably in contact with the resilient part.

DANIEL DOOLITTLE WELLS.